United States Patent
Kim et al.

(10) Patent No.: US 11,074,171 B2
(45) Date of Patent: Jul. 27, 2021

(54) DATA STORAGE DEVICE FOR RECOVERING READ ERRORS

(71) Applicant: Samsung Electronics Co., Ltd., Suwon-si (KR)

(72) Inventors: Soo Hyun Kim, Cheongju-si (KR); Dong-Young Seo, Suwon-si (KR); Sang Kwon Moon, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 59 days.

(21) Appl. No.: 15/994,247

(22) Filed: May 31, 2018

(65) Prior Publication Data

US 2019/0129839 A1    May 2, 2019

(30) Foreign Application Priority Data

Nov. 2, 2017    (KR) .......................... 10-2017-0145397

(51) Int. Cl.
*G06F 12/02* (2006.01)
*G06F 3/06* (2006.01)
*G06F 12/0804* (2016.01)

(52) U.S. Cl.
CPC ........ *G06F 12/0246* (2013.01); *G06F 3/0614* (2013.01); *G06F 3/0656* (2013.01); *G06F 3/0659* (2013.01); *G06F 3/0679* (2013.01); *G06F 12/0292* (2013.01); *G06F 12/0804* (2013.01); *G06F 3/0631* (2013.01); *G06F 2212/2022* (2013.01); *G06F 2212/7201* (2013.01); *G06F 2212/7203* (2013.01)

(58) Field of Classification Search
CPC ............. G06F 12/0246; G06F 12/0292; G06F 12/0804; G06F 3/0679; G06F 3/0614; G06F 3/0656; G06F 3/0659; G06F 2212/7201; G06F 2212/2022; G06F 2212/7203

See application file for complete search history.

(56) References Cited

U.S. PATENT DOCUMENTS 7,599,220 B2    10/2009  Lin et al.
9,110,827 B2     8/2015  Sakai et al.
(Continued)

FOREIGN PATENT DOCUMENTS

JP    2012-203957 A    10/2012
JP       5870901 B2     3/2016
(Continued)

*Primary Examiner* — Jane Wei
(74) *Attorney, Agent, or Firm* — Harness, Dickey & Pierce, P.L.C.

(57) ABSTRACT

A data storage device is provided. The data storage device a buffer configured to store a mapping table comprising physical block addresses (PBAs) corresponding to logical block addresses (LBAs), a non-volatile memory configured to store data; and a controller configured to control the buffer and the non-volatile. The controller is configured to read data stored at a first PBA of the non-volatile memory corresponding to a first LBA by referring to the mapping table when receiving a command to read data corresponding to the first LBA from outside of the data storage device, and, when a second LBA included in the data read from the non-volatile memory is different from the first LBA, retry reading, from the non-volatile memory, the data corresponding to the first LBA.

20 Claims, 14 Drawing Sheets

(56) References Cited

U.S. PATENT DOCUMENTS

| | | | |
|---|---|---|---|
| 9,472,275 B2 | 10/2016 | Park et al. | |
| 9,524,790 B1 | 12/2016 | Steiner et al. | |
| 9,548,128 B2 | 1/2017 | Huang | |
| 2010/0031000 A1* | 2/2010 | Flynn | G06F 16/9014 |
| | | | 711/216 |
| 2016/0266970 A1* | 9/2016 | Amaki | G11C 16/26 |
| 2017/0154657 A1 | 6/2017 | Kim | |
| 2017/0162270 A1 | 6/2017 | Park et al. | |
| 2017/0168892 A1 | 6/2017 | Roh et al. | |
| 2017/0269873 A1* | 9/2017 | Tan | G06F 3/0619 |
| 2018/0349287 A1* | 12/2018 | Kan | G06F 12/1009 |

FOREIGN PATENT DOCUMENTS

| | | |
|---|---|---|
| KR | 2016-0014473 A | 2/2016 |
| KR | 2017-0062254 A | 6/2017 |

* cited by examiner

DATA STORAGE DEVICE FOR RECOVERING READ ERRORS

This application claims the benefit of Korean Patent Application No. 10-2017-0145397, filed on Nov. 2, 2017, in the Korean Intellectual Property Office, the disclosure of which is incorporated herein in its entirety by reference.

BACKGROUND

The present inventive concept relates to a data storage device.

A data storage device, for example, a storage device using a flash memory, may use a mapping table to translate a logical block address (LBA) of a host into a physical page number (PPN) of the flash memory.

When the host sends a read command for an LBA, the data storage device translates the LBA into a PPN of the flash memory by using the mapping table, and performs a read operation at the PPN.

However, when the data storage device translates the LBA into the PPN of the flash memory by using the mapping table, an external impact or a temporary hardware error may occur. In this case, the data storage device may read data at a wrong position instead of the LBA requested by the host.

If such a problem occurs, the reliability of data read is not ensured.

SUMMARY

Example embodiments of inventive concepts provide a data storage device which ensures reliability by performing a read operation again when data read in response to a data read command from the outside is not expected data.

Example embodiments of inventive concepts also provide a data storage device which ensures reliability and speed by referring to operation history recorded in a cache in response to a data read command from the outside and performing a read operation again when read data is not expected data.

However, example embodiments of inventive concepts are not restricted to the one set forth herein. The above and other aspects of inventive concepts will become more apparent to one of ordinary skill in the art to which inventive concepts pertains by referencing the detailed description of inventive concepts given below.

According to an example embodiments of inventive concepts, there is provided a data storage device comprising a buffer configured to store a mapping table comprising physical block addresses (PBAs) corresponding to logical block addresses (LBAs), a non-volatile memory configured to store data; and a controller configured to control the buffer and the non-volatile. The controller is configured to read data stored at a first PBA of the non-volatile memory corresponding to a first LBA by referring to the mapping table when receiving a command to read data corresponding to the first LBA from outside of the data storage device, and, when a second LBA included in the data read from the non-volatile memory is different from the first LBA, retry reading, from the non-volatile memory, the data corresponding to the first LBA.

According to example embodiments of inventive concepts, there is provided a data storage device comprising: a buffer, a non-volatile memory configured to store a mapping table comprising physical block addresses (PBAs) corresponding to logical block addresses (LBAs), and a controller configured to control the buffer and the non-volatile memory The controller is configured to store, in the buffer, the mapping table when power is supplied externally, read data stored at a first PBA of the non-volatile memory corresponding to a first LBA by referring to the mapping table stored in the buffer when receiving a command to read the data from outside of the data storage device, retry reading the data corresponding to the first LBA from the non-volatile memory when a second LBA included in the data read from the non-volatile memory is different from the first LBA, and store, in the non-volatile memory, the mapping table when the power is not supplied.

According to example embodiments of inventive concepts, there is provided A data storage device comprising a buffer configured to store a mapping table comprising physical block addresses (PBAs) corresponding to logical block addresses (LBAs), a non-volatile memory, and a controller configured to control the buffer and the non-volatile memory. The controller is configured to receive first data comprising a first LBA and first user data from outside of the data storage device, store the first LBA and the first user data at a PBA of the non-volatile memory corresponding to the first LBA by referring to the mapping table, and repeat a read operation until second data comprising a second LBA is read from the non-volatile memory when receiving, from the outside of the data storage device, a command to read the second data comprising the second LBA.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
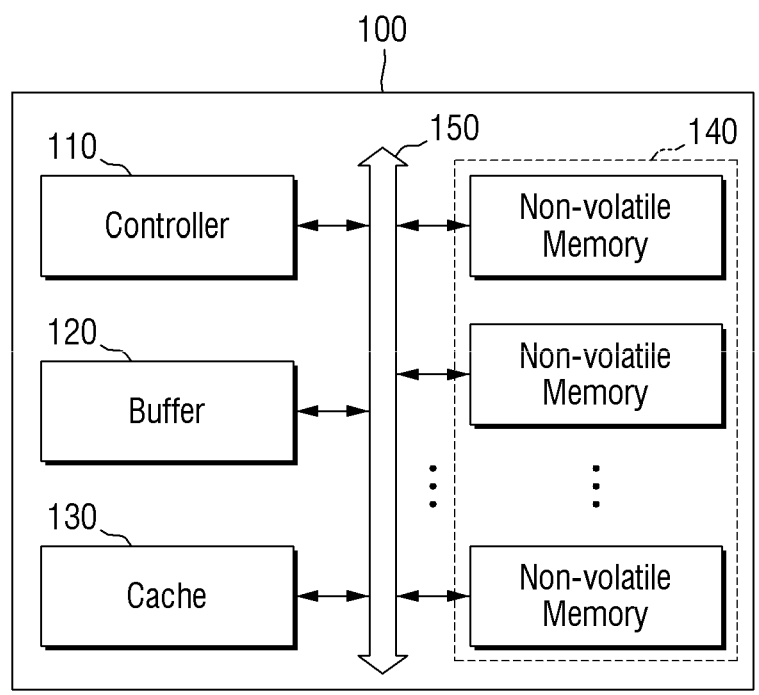
FIG. 1 is a block diagram of a data storage device according to some example embodiments.

FIG. 1 is a block diagram of a data storage device 100 according to some example embodiments.

Referring to FIG. 1, the data storage device 100 may include a controller 110, a buffer 120, a cache 130, and a non-volatile memory 140.

The controller 110 may control the buffer 120, the cache 130, and the non-volatile memory 140. The controller 110 may exchange commands and data among a host, the buffer 120, the cache 130, and the non-volatile memory 140. Although not illustrated in the drawing, the controller 110 may also control the overall operation (e.g., a read and/or write operation) of the data storage device 100 in response to a request from the host. The controller 110 will now be described in detail with reference to FIG. 2.

Figure 2:
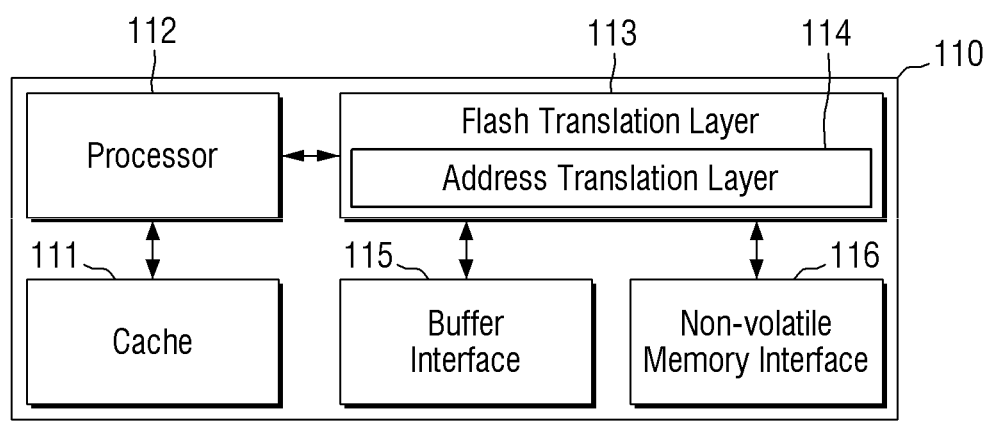
FIG. 2 is a block diagram of a controller storage device according to some example embodiments.

FIG. 2 is a block diagram of a controller 110 of a storage device according to some example embodiments.

Referring to FIG. 2, the controller 110 may include a cache 111, a processor 112, a flash translation layer 113, a buffer interface 115, and a non-volatile memory interface 116.

The cache 111 may be the same as the cache 130 of FIG. 1. For example, the cache 111 or 130 may be included in the controller 110 or may be configured as a hardware module independent of the controller 110. The cache 111 or 130 will be described in detail later.

The processor 112 may be a device or program that performs data processing or computation. For example, the processor 112 may include a microprocessor. The processor 112 may also be a program processor that translates a program language into a machine language.

The flash translation layer 113 may include an address translation layer 114. The address translation layer 114 may translate a block address requested by the host into an actual block address of the non-volatile memory 140. The flash translation layer 113 may be implemented as firmware, software, or a combination of firmware and software. The process of translating a block address requested by the host into an actual block address of the non-volatile memory 140 will be described later.

The flash translation layer 113 may perform wear leveling and garbage collection, in addition to translating a block address.

The buffer interface 115 and the non-volatile memory interface 116 may include protocols used in, e.g. required for data exchange between the controller 110 and the buffer 120 and between the controller 110 and the non-volatile memory 140, respectively. For example, each of the buffer interface 115 and the non-volatile memory interface 116 may be configured to communicate with the controller 110 through various interface protocols such as, but not limited to, a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a non-volatile memory express (NVMe) protocol, and/or a query request protocol.

Referring again to FIG. 1, the buffer 120 may temporarily store data received from the host. In addition, the buffer 120 may temporarily store a mapping table used in, e.g. used in, e.g. required for the address translation layer 114 to translate a block address requested by the host into an actual block address of the non-volatile memory 140.

The buffer 120 may include a high-speed volatile or non-volatile memory. For example, the buffer 120 may be a dynamic random access memory (DRAM) or a single level cell (SLC) region of a flash memory.

The cache 130 may be the same as the cache 111 of FIG. 2, as described above. For example, the cache 111 can be included in the controller 110. The cache 130 may also be configured as a hardware module independent of the controller 110. For ease of description, a case where the cache 130 is configured as a hardware module independent of the controller 110 will hereinafter be described as an example.

The cache 130 may be or may include a memory that can temporarily store data in preparation for future requests so that the data can be accessed fast. The data stored in the cache 130 may be the results of operations performed previously. For example, when data is written to the non-volatile memory 140 in response to a write command from the host, the cache 130 may temporarily store a logical block address (LBA) included in the write command, the data to be written, and/or an actual physical block address (PBA) of the non-volatile memory 140.

In addition, the data stored in the cache 130 may be a copy of data stored in the buffer 120 or the non-volatile memory 140. For example, the cache 130 may temporarily store part of the mapping table stored in the buffer 120 or the non-volatile memory 140.

Using the data stored in the cache 130, the controller 110 may save the time to access the data and recalculate the same value. When data requested by the host is found in the cache 130, the data request may be called a "cache hit." However, when the data requested by the host is not found in the cache 130, is the data request may be called a "cache miss."

The cache 130 may be, but is not limited to, a static random access memory (SRAM).

The non-volatile memory 140 may store data received from the host. In addition, the non-volatile memory 140 may non-temporarily store a mapping table required for the address translation layer 114 to translate a block address requested by the host into an actual block address of the non-volatile memory 140.

For example, the non-volatile memory 140 may be or may include a flash memory including a NAND flash. The flash memory may include, but not limited to, SLC and multilevel cell (MLC) regions. Examples of the non-volatile memory 140 may include a Personal Computer Memory Card International Association (PCMCIA) card (a PC card), a compact flash (CF) card, a smart media card (SM, SMC), a memory stick, a multimedia card (MMC, RS-MMC, MMCmicro), a secure digital (SD) card (SD, miniSD, microSD, SDHC), a universal flash storage (UFS), an embedded multimedia card (eMMC), a NAND flash memory, a NOR flash memory, and/or a V-NAND flash memory.

The data storage device 100 may further include a data bus 150 that can be used by the controller 110, the buffer 120, the cache 130 and the non-volatile memory 140 to perform data communication with each other. The data bus 150 may be a path through which data is moved and may include a protocol for data exchange.

The operation of the data storage device 100 in a case where data read in response to a data read command from the host is not the data expected by the flash translation layer 113 will now be described.

Figure 3:
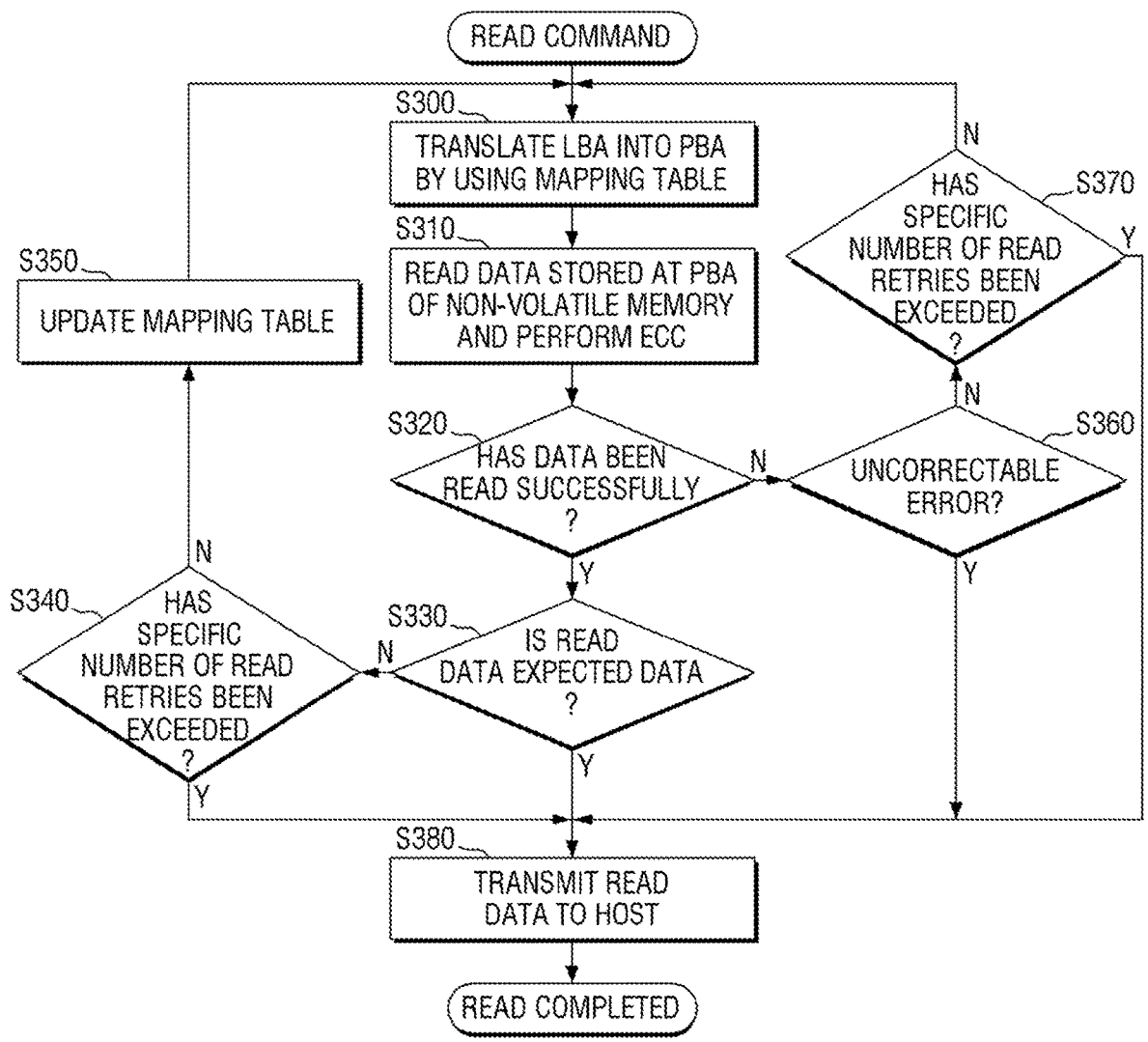
FIG. 3 is a flowchart illustrating the operation of the controller in response to a data read command from the host according to some example embodiments.

FIG. 3 is a flowchart illustrating the operation of the controller 110 in response to a data read command from the host according to some example embodiments.

Referring to FIG. 3, a data read command may be received from the host. In this case, the controller 110 may translate an LBA into a PBA of the non-volatile memory 140 by using a mapping table stored in the buffer 120 (operation S300). Mapping tables including LBAs and PBAs according to some example embodiments will now be described in detail with reference to FIGS. 4A through 4D.

FIGS. 4A through 4D illustrate mapping tables including LBAs and PBAs according to some example embodiments.

Figure 4A:
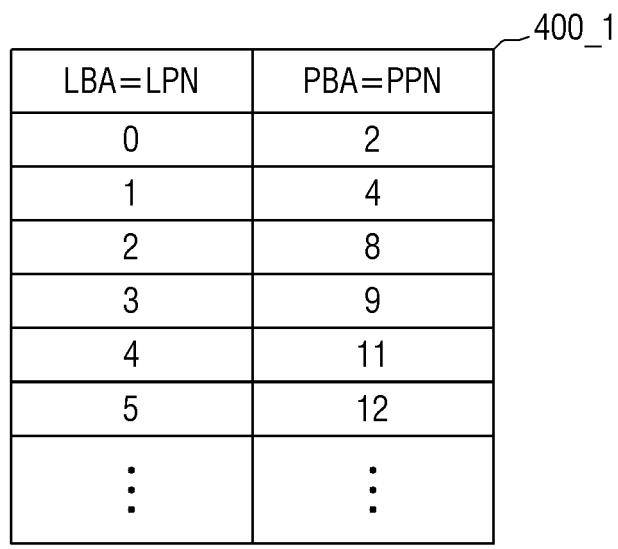
FIGS. 4A through 4D illustrate mapping tables including LBAs and PBAs according to some example embodiments.

Referring to FIG. 4A, a mapping table 400_1 may include LBAs and PBAs of the non-volatile memory 140 which correspond to the LBAs. For example, an LBA may be a logical page number (LPN) of the host. In addition, a PBA may be a physical page number (PPN) of the non-volatile memory 140.

For example, when the flash translation layer 113 performs mapping on a page-by-page basis, that is, when a unit, e.g. a minimum unit, of read and write operations requested from the host is a page, an LBA and a PBA may be an LPN and a PPN, respectively.

For example, when receiving a command to read data corresponding to LBA 0 from the host, the data storage device 100 may transmit data stored at PPN 2 of the non-volatile memory 140 to the host by referring to the mapping table 400_1.

Figure 4B:
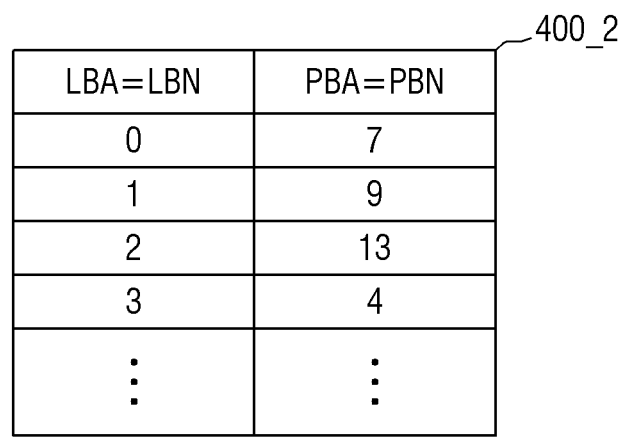

Referring to FIG. 4B, a mapping table 400_2 may include LBAs and PBAs of the non-volatile memory 140 which correspond to the LBAs. For example, an LBA may be a logical block number (LBN) of the host. In addition, a PBA may be a physical block number (PBN) of the non-volatile memory 140.

For example, when the flash translation layer 113 performs mapping on a block-by-block basis, each block being a set of pages, that is, when the minimum unit of the read and write operations requested from the host is a block, an LBA and a PBA may be an LBN and a PBN, respectively.

For example, when receiving a command to read data corresponding to LBA 0 from the host, the data storage device 100 may transmit data stored at PBN 7 of the non-volatile memory 140 to the host.

Figure 4C:
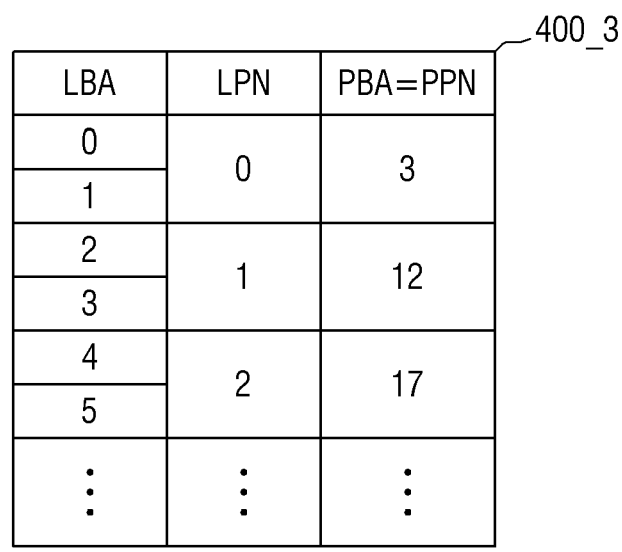

Referring to FIG. 4C, a mapping table 400_3 may include LBAs and PBAs of the non-volatile memory 140 which correspond to the LBAs. For example, an LBA of the host may be a unit smaller than a page of the non-volatile memory 140.

The way that data is stored in the non-volatile memory 140 when the mapping table 400_3 of FIG. 4C is used will now be described with reference to FIG. 4D.

Figure 4D:
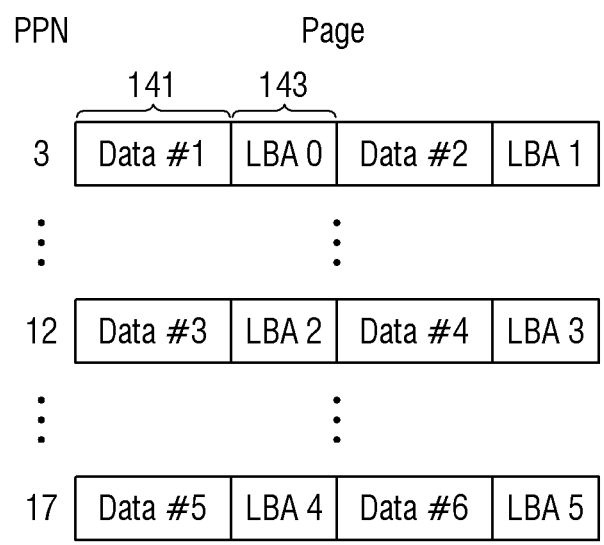

In FIGS. 4C and 4D, one PBA of the non-volatile memory 140 corresponds to two LBAs of the host. However, embodiments are not limited to this case.

Referring to FIG. 4D, a page included in the non-volatile memory 140 may include a user data region 141 and a spare region 143. The user data region 141 may include data to be stored, and the spare region 143 may include an LBA corresponding to the data to be stored. Each pair of one user data region 141 and one space region 143 may be an error correcting code (ECC) chunk for error correction. Although only an LBA is stored in the spare region 143 in the drawing, embodiments are not limited to this case. For example, the spare region 143 may include ECC parity for error correction.

When the mapping table 400_3 of FIG. 4C is used, a page of the non-volatile memory 140 may store, e.g. sequentially store LBAs and data corresponding to the LBAs. For example, when data #1 and data #2 are stored at LBA 0 and LBA 1, respectively, data #1, LBA 0, data #2 and LBA 1 may be stored sequentially in this order in PPN 3 of the non-volatile memory 140 with reference to the mapping table 400_3.

For example, assuming that the page of the non-volatile memory 140, the user data region 141 and the spare region 143 are 8 bits, 3 bits, and 1 bit, respectively, when data is written to PPN 3, data #1 may be stored in first through third bits, LBA 0 in a fourth bit, data #2 in fifth through seventh bits, and LBA 1 in an eighth bit.

For example, assuming that the page of the non-volatile memory 140, the user data region 141 and the spare region 143 are 8 bits, 3 bits, and 1 bit, respectively, when data corresponding to LBA 0 is to be read, the controller 110 may access PPN 3 and read data and may output the data stored in the first through fourth bits to the host.

Inventive concepts are not limited to the example embodiments disclosed in FIGS. 4A through 4D. For ease of description, a case where an LBA is an LPN and a PBA is a PPN will hereinafter be described as an example.

Referring again to FIG. 3, data stored in the PBA of the non-volatile memory 140 may be read, and an error, if any, in the read data may be corrected (operation S310). The error correction process is just an example and can be omitted.

Then, the controller 110 may determine whether the data has been read successfully (operation S320). For example, if no data has been read (clean or floating) or if the read data is uncorrectable data, the data may be determined to have not been read successfully. However, the data may be determined to have been read successfully if the read data, which is not the uncorrectable data, exists.

Next, whether the read data may be determined to be data expected by the flash translation layer 113, that is, whether the read data is data requested by the host (operation S330). This operation will now be described in detail with reference to FIG. 5.

Figure 5:
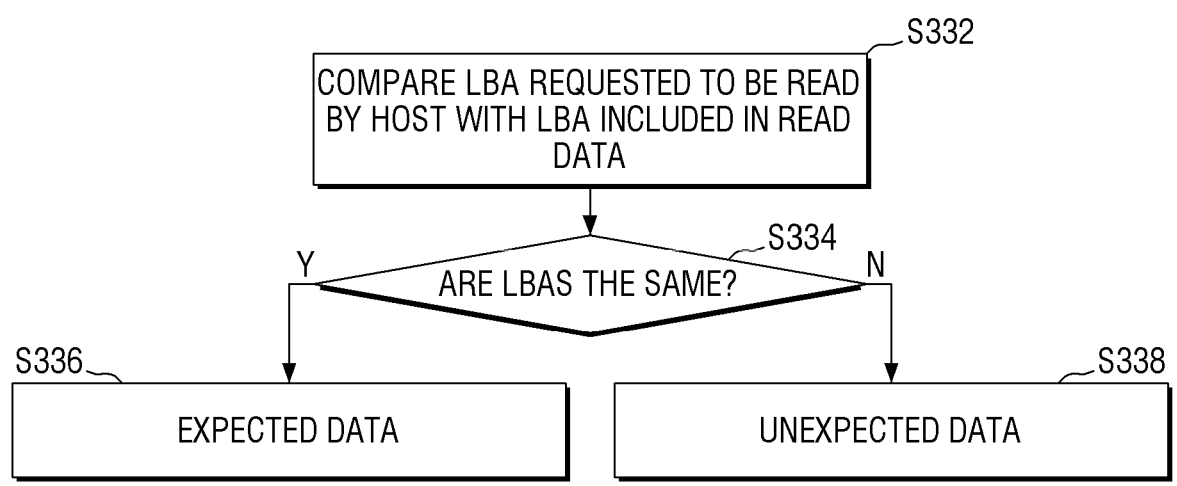
FIG. 5 is a flowchart illustrating a method of determining whether read data of the data storage device is data expected by the flash translation layer according to some example embodiments.

FIG. 5 is a flowchart illustrating a method of determining whether read data of the data storage device 100 is data expected by the flash translation layer 113 according to some example embodiments.

Referring to FIG. 5, if data is successfully read, an LBA requested to be read by the host may be compared with an LBA included in the read data (operation S332).

In some embodiments, a data write command received from the host may include data to be written and an LBA of the data to be written. Therefore, when receiving the data write command from the host, the controller 110 may store both the LBA and the received data in the non-volatile memory 140. Hence, if data is successfully read, the read data may include an LBA.

If the LBA requested to be read by the host is the same as the LBA included in the read data (operation S334), the read data may be the data expected by the flash translation layer 113, that is, the data requested to be read by the host (operation S336).

If the LBA requested to be read by the host is different from the LBA included in the read data (operation S334), the read data may not be the data expected by the flash translation layer 113, that is, the data requested to be read by the host (operation S338).

Referring again to FIG. 3, if the data has been successfully read and the read data is the data expected by the flash translation layer 113, the controller 110 may transmit the read data to the host (operation S380).

However, if the data has been successfully read but the read data is not the data expected by the flash translation layer 113, whether a desired (or, alternatively, predetermined) number of read retries may be determined to have been exceeded (operation S340).

If the desired (or, alternatively, predetermined) number of read retries has been exceeded, the controller 110 may transmit the read data to the host (operation S380).

However, if the desired (or, alternatively, predetermined) number of read retries has not been exceeded, the controller 110 may update the mapping table stored in the buffer 120 (operation S350) and perform a read operation again (operations after S300). However, even when the read operation is performed again, if updating the mapping table stored in the buffer 120 is not to be performed, e.g. is not necessary, the process of updating the mapping table (operation S350) may be omitted. The update of the mapping table may be unnecessary, for example, when there are no details of operations recorded in the cache 130.

The relationship between a mapping table stored in the buffer 120, a mapping table stored in the non-volatile memory 140 and information recorded in the cache 130 and the process of updating a mapping table will now be described with reference to FIGS. 6 through 8.

Figure 6:
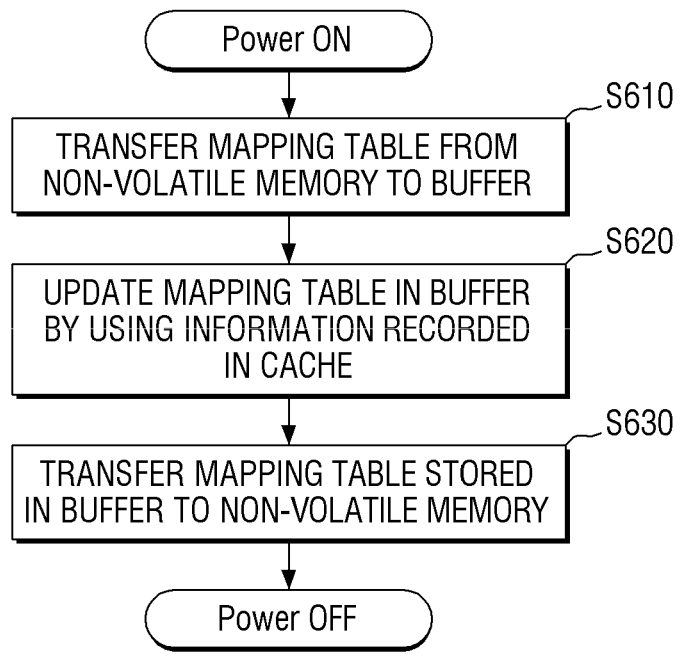
FIG. 6 is a flowchart illustrating the storage path and update of a mapping table according to some example embodiments.

FIG. 6 is a flowchart illustrating the storage path and update of a mapping table according to some example embodiments.

Referring to FIG. 6, the data storage device 100 may be supplied with external power, e.g. power from the outside. If the power supply is interrupted, a mapping table temporarily stored in the buffer 120 may be lost. Therefore, when power is supplied to the data storage device 100, the mapping table non-temporarily stored in the non-volatile memory 140 may first be transferred to the buffer 120 (operation S610).

If the mapping table stored in the buffer 120 is to be updated, the mapping table may be updated based on details of previous operations recorded in the cache 130 (operation S620).

As described above, the cache 130 may store the results of previous operations or the details of previous operations. Therefore, the cache 130 may include the latest mapping information between an LBA and a PPN. If the mapping table stored in the buffer 120 does not include the latest information, the mapping table may be updated based on operation history stored in the cache 130.

Then, the mapping table temporarily stored in the buffer 120 may be transferred to the non-volatile memory 140 and non-temporarily stored in the non-volatile memory 140 before the data storage device 100 is powered off (operation S630).

Although a case where the mapping table stored in the buffer 120 is stored in the non-volatile memory 140 before the data storage device 100 is powered off has been described above, embodiments are not limited to this case. For example, the data storage device 100 may include an emergency power supply (such as a battery or a UPS), and the emergency power supply may supply emergency power to the data storage device 100 when the power supply to the data storage device 100 is suddenly interrupted. For example, the mapping table stored in the buffer 120 can be stored in the non-volatile memory 140 even after the data storage device 100 is suddenly powered off.

In other some embodiments, the mapping table stored in the buffer 120 can be updated not just when data reading is retried. For example, if there is insufficient space in the cache 130 to record operation history, the mapping table stored in the buffer 120 may also be updated using operation history recorded in the cache 130. In other some embodiments, the mapping table stored in the buffer 120 can be updated periodically.

To help understand the process of updating a mapping table, reference will be made to FIGS. 7 and 8.

Figure 7:
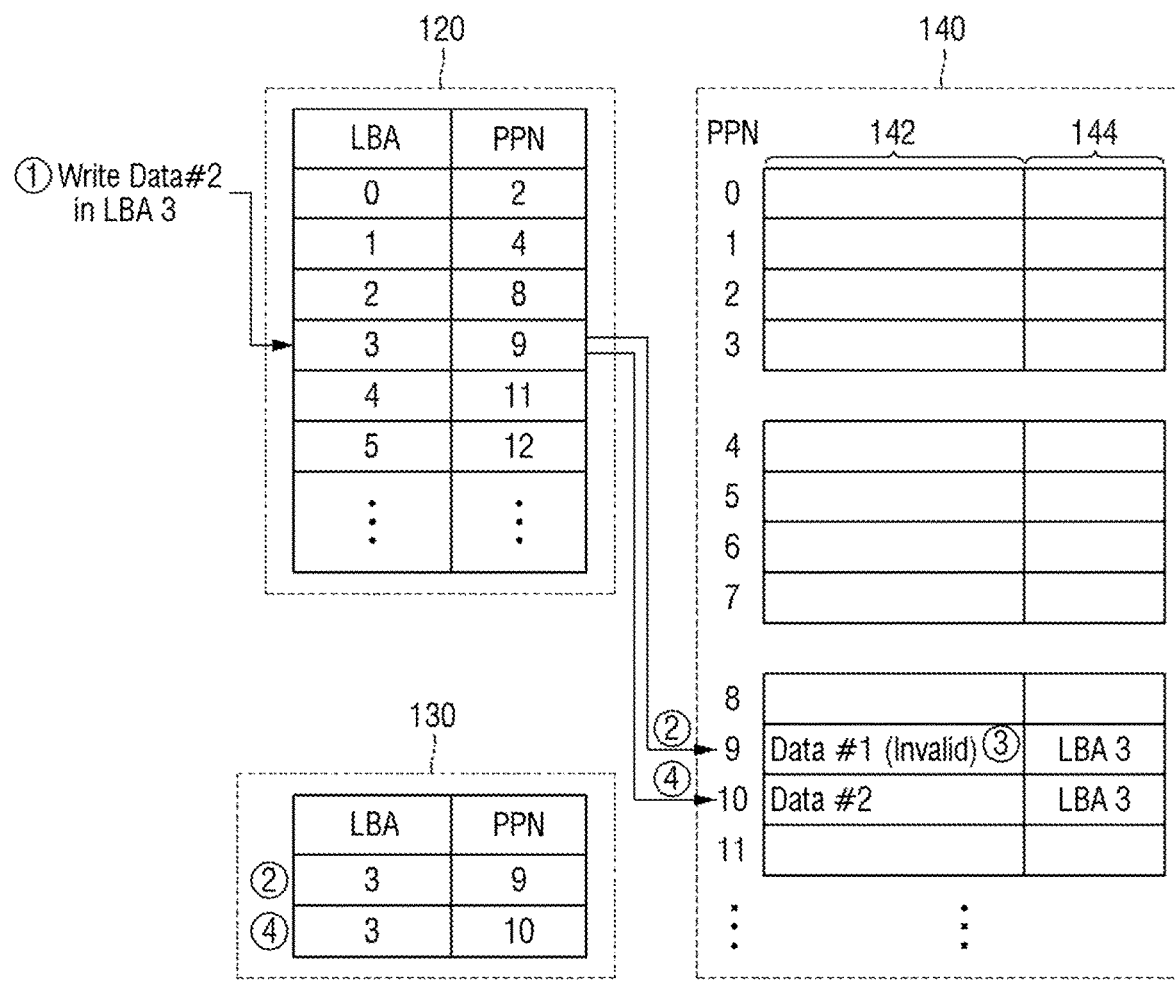
FIG. 7 illustrates the operation of the buffer, the cache and the non-volatile memory during a write operation of the data storage device according to some example embodiments.

FIG. 7 illustrates the operation of the buffer 120, the cache 130 and the non-volatile memory 140 during a write operation of the data storage device 100 according to some example embodiments.

Referring to FIG. 7, a command to write data to LBA 3 may be received from the host (Write data #2 in LBA 3, ①).

The controller 110 may access the buffer 120 and translate LBA 3 into a PPN of the non-volatile memory 140 which corresponds to LBA 3 by using a mapping table. In this case, LBA 3 is translated into PPN 9. Then, the controller 110 accesses PPN 9 of the non-volatile memory 140. At this time, the record of accessing PPN 9 corresponding to LBA 3 may be stored in the cache 130 (②).

If the controller 110 accessing PPN 9 of the non-volatile memory 140 finds out that there is already data (data #1) written to PPN 9, the controller 110 may invalidate the data (data #1) stored in PPN 9 (invalid, ③).

Then, the controller 110 may allocate a new PPN, e.g., PPN 10 corresponding to LBA 3 and store data (data #2) in a user data region 142 of PPN 10 and LBA 3 in a spare region 144, respectively.

At this time, the record of storing the data (data #2) in PPN 10 corresponding to LBA 3 may be stored in the cache 130 (④).

Although a case where only LBAs and PPNs are recorded in the cache 130 is illustrated in the drawing, data stored in the non-volatile memory 140 may also be recorded in the cache 130.

Figure 8:
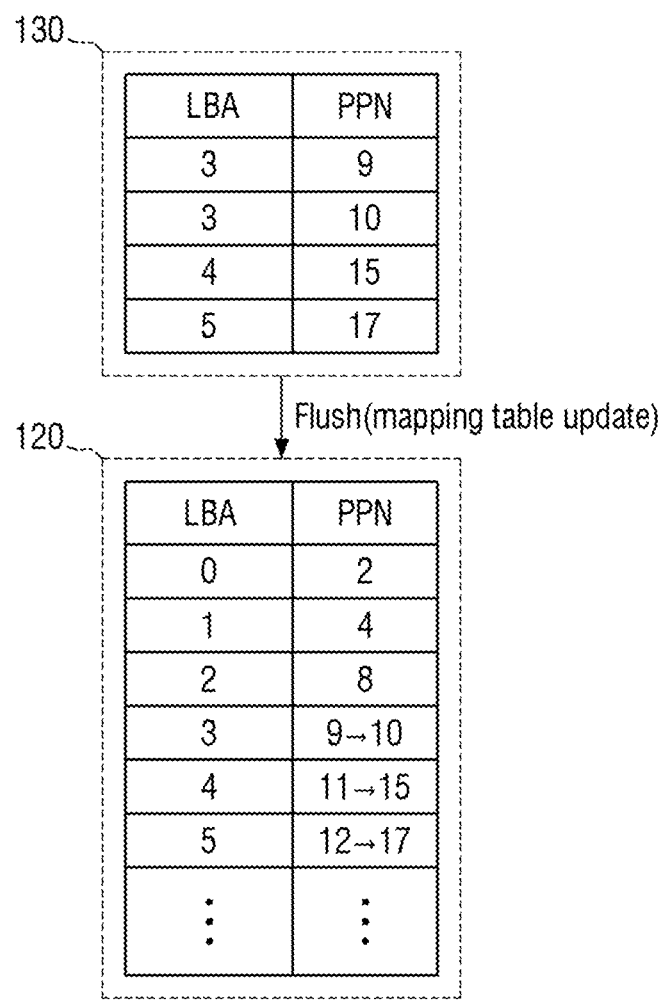
FIG. 8 illustrates the process of updating a mapping table stored in the buffer according to some example embodiments.

FIG. 8 illustrates the process of updating a mapping table stored in the buffer 120 according to some example embodiments.

Referring to FIG. 8, the buffer 120 may store a mapping table showing the correspondence relationship between an LBA requested by the host and an actual PPN of the non-volatile memory 140.

Operation history recently performed by the data storage device 100 may be recorded in the cache 130. In FIG. 8, operation history stored in a relatively upper part of the cache 130 may be assumed to be older than operation history stored in a relatively lower part of the cache 130. For example, it can be seen that a PPN of the non-volatile memory 140 which corresponds to LBA 3 recorded in the cache 130 has recently been changed from PPN 9 to PPN 10 by an operation (e.g., a write operation).

Although a case where only LBAs and PPNs are stored in the cache 130 in some embodiments has been described for the sake of convenience, embodiments are not limited to this case.

In some embodiments, the mapping table stored in the buffer 120 may not reflect the latest information. Therefore, recent operation history recorded in the cache 130 may be referred to in order to update the mapping table stored in the buffer 120 with the latest information.

For example, in the mapping table stored in the buffer 120 of FIG. 8, LBA 3, LBA 4, and LBA 5 do not reflect the latest information. Therefore, the mapping table stored in the buffer 120 may be updated using information of LBA 3, LBA 4 and LBA 5 recorded in the cache 130. Here, LBA 3, LBA 4 and LBA 5 of the mapping table stored in the buffer 120 may be updated to PPN 10, PPN 15 and PPN 17, respectively.

Referring again to operation S320 of FIG. 3, if the data has not been read successfully, the controller 110 determines whether the read data is uncorrectable data (operation S360). As described above, the data may be determined to have not been read successfully if the read data is uncorrectable data or if there is no read data (clean, floating).

If the read data is not uncorrectable data, that is, if there is no read data, whether the desired (or, alternatively, predetermined) number of read retries may be determined to have been exceeded (operation S370).

If the desired (or, alternatively, predetermined) number of read retries has not been exceeded, the controller 110 may perform a read operation again (operations after S300).

However, if the desired (or, alternatively, predetermined) number of read retries has been exceeded, the controller 110 may transmit the read data to the host. That is, the controller 110 may transmit information indicating that there is no read data to the host (operation S380).

If the read data is uncorrectable data, the controller 110 may transmit the uncorrectable data to the host (operation S380).

Figure 9:
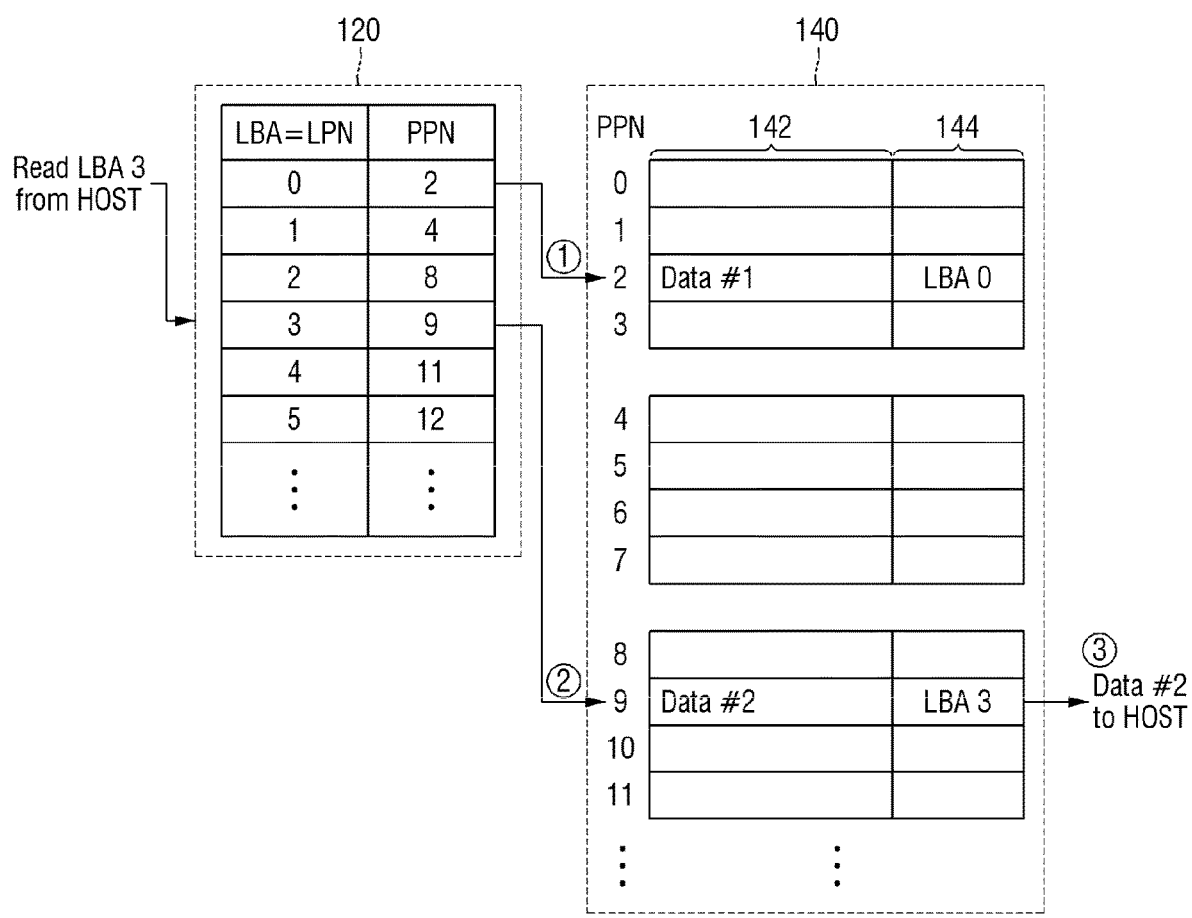
FIG. 9 illustrates the process in which the data storage device performs a read operation again according to some example embodiments.

FIG. 9 illustrates the process in which the data storage device 100 performs a read operation again according to some example embodiments.

Referring to FIG. 9, the non-volatile memory 140 may include a user data region 142 and a spare region 144. Data may be stored in the user data region 142, and LBAs may be stored in the spare region 144.

A command to read LBA 3 may be received from the host (Read LBA 3). In this case, the controller 110 may access the buffer 120 and translate LBA 3 into a PPN of the non-volatile memory 140 by using a mapping table stored in the buffer 120. Here, the PPN corresponding to LBA 3 may be PPN 9.

However, due to an external impact or a physical error, the controller 110 can have an error when translating an LBA of the host into a PPN of the non-volatile memory 140. In this case, the controller 110 may read data at PPN 2 instead of PPN 9 of the non-volatile memory 140 (①). Here, the read data may include data #1 and LBA 0.

The controller 110 may compare an LBA requested to be read by the host with an LBA included in the read data. Since LBA 3 requested to be read by the host and LBA. 0 included in the read data are not the same, the controller 110 may retry to read data included in PPN 9 of the non-volatile memory 140 (②).

Again, the controller 110 may compare the LBA requested to be read by the host with the LBA included in the read data. Since LBA 3 requested to be read by the host and LBA 3 included in the read data are the same, the controller 110 may transmit the read data (data #2) to the host (③).

Figure 10:
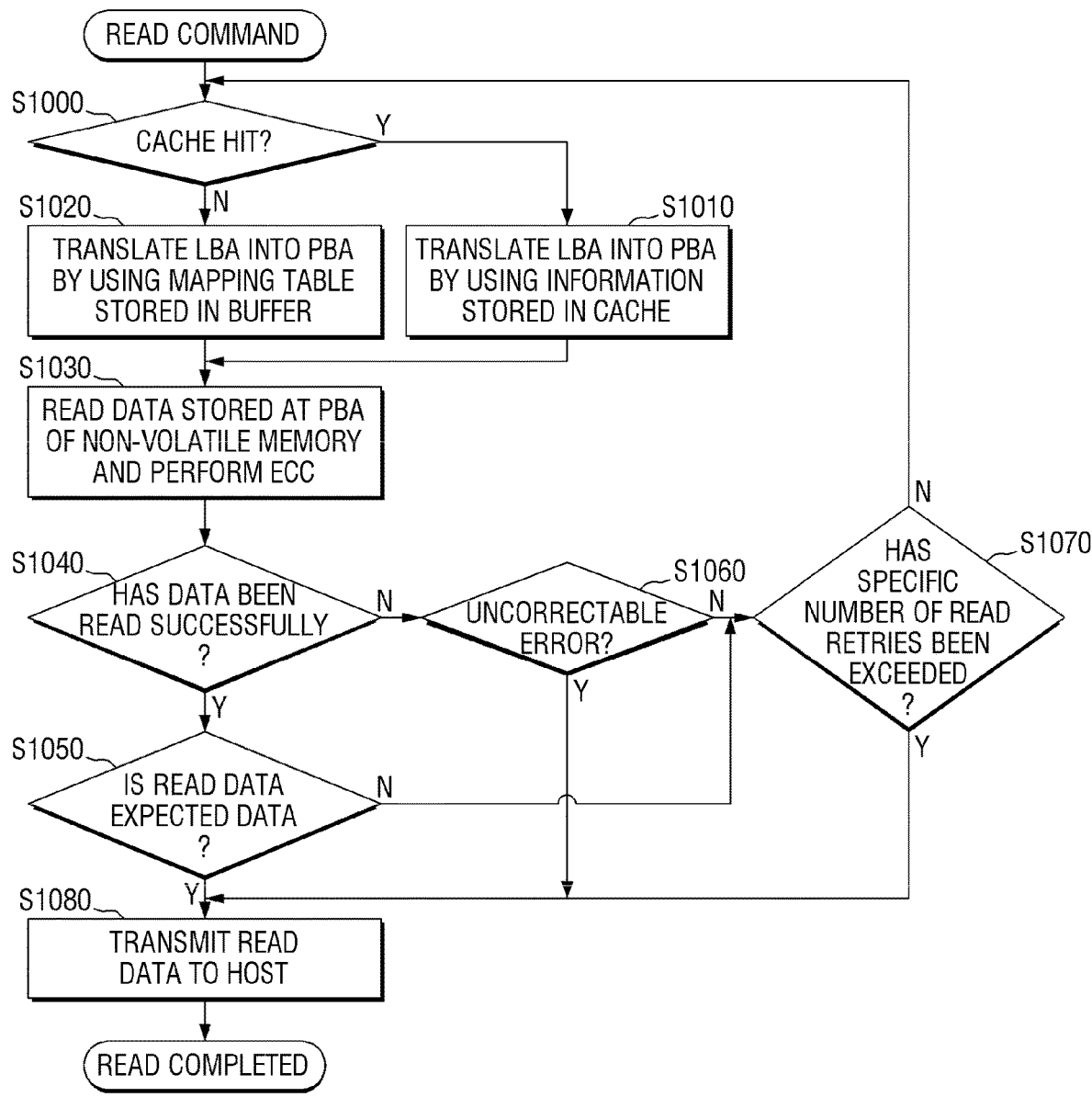
FIG. 10 is a flowchart illustrating the operation of the controller in response to a data read command from the host according to some example embodiments.

FIG. 10 is a flowchart illustrating the operation of the controller 110 in response to a data read command from the host according to some example embodiments. For simplicity, any redundant description will be omitted or given briefly.

In FIG. 10, it is assumed that the cache 130 according to the embodiments is a map cache including LBAs and PPNs of the non-volatile memory 140 which correspond to the LBAs among recent operation history.

In some embodiments, by using the LBAs and the PPNs of the non-volatile memory 140 which correspond to the LBAs recorded in the cache 130, the controller 110 may access only the cache 130 without via the flash translation layer 113 and directly translate an LBA into a PPN corresponding to the LBA. That is, if a read request is received from the host and a cache hit occurs, an LBA can be translated into a PPN corresponding to the LBA without via the buffer 120 (operations S1000 and S1010). However, if a read request is received from the host and a cache miss occurs, an LBA may be translated into a PPN corresponding to the LBA by using a mapping table stored in the buffer 120 (operations S1000 and S1020).

Operations S1030 through S1080 may be the same as the operations described above with reference to FIG. 3. However, since the controller 110 accesses the cache 130 first and refers to recent operation history, the operation of updating the mapping table stored in the buffer 120 when a read operation is performed again may be omitted.

In the case of a cache hit, an LBA is translated into a PPN corresponding to the LBA by using mapping information recorded in the cache 130, and then operations S1030 through S1080 are performed. However, embodiments are not limited to this case. For example, if the cache 130 includes not only LBAs and PPNs corresponding to the LBAs but also data related to the LBAs and the PPNs, the data related to the LBAs and the PPNs recorded in the cache 130 may be read, and then operations S1030 through S1080 may be performed in order for a fast read operation in the case of a cache hit. In addition, if the cache 130 includes not only LBAs and PPNs corresponding to the LBAs but also data related to the LBAs and the PPNs, the data related to the LBAs and the PPNs recorded in the cache 130 may be read and then immediately transmitted to the host in order for a fast read operation in the case of a cache hit. That is, operations S1030 through S1080 may not be performed.

Figure 11:
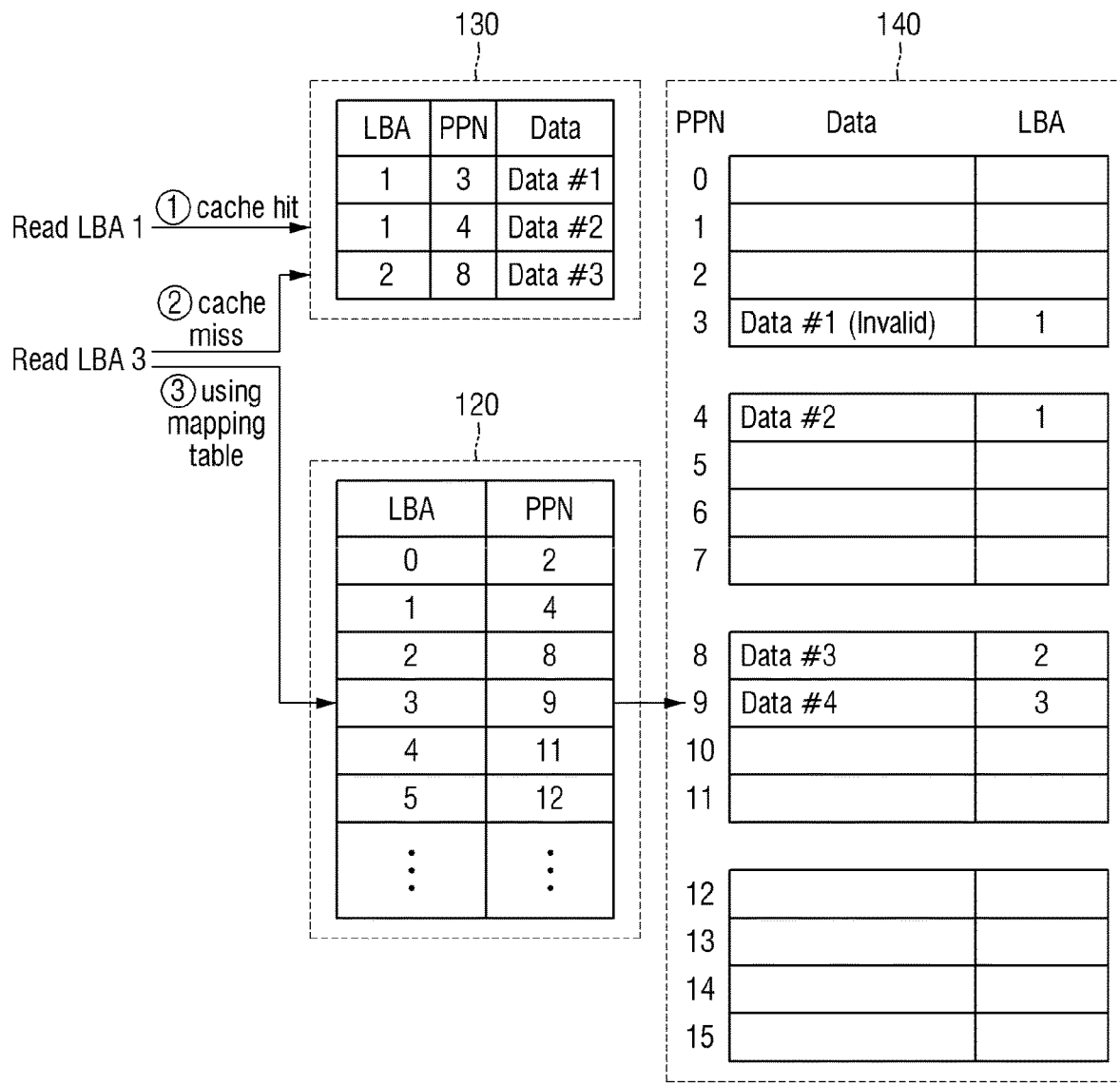
FIG. 11 illustrates a read operation of the data storage device according to some example embodiments.

FIG. 11 illustrates a read operation of the data storage device 100 according to some example embodiments. For ease of description, any redundant description will be omitted or given briefly.

Referring to FIG. 11, a command to read LBA 1 may be received from the host (Read LBA 1). Here, since information about LBA 1 and PPN 4 exists in the cache 130, the controller 110 can complete the translation of LBA 1 without via the buffer 120. In other some embodiments, since data (data #2) about LBA 1 is recorded in the cache 130, it can be read using the cache 130 (①, cache hit).

However, a command to read LBA 3 can be received from the host (Read LBA 3). In this case, the controller 110 may access the buffer 120 and use a mapping table (③, using mapping table) because the cache 130 does not have data about LBA 3 (②, cache miss).

While inventive concepts have been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A data storage device comprising:
   a buffer configured to store a mapping table comprising physical block addresses (PBAs) corresponding to logical block addresses (LBAs);
   a non-volatile memory including a plurality of pages, each of the plurality of pages including a user data region and a spare region, the spare region configured to store error-correction code (ECC) information and an LBA;
   a controller configured to control the buffer and the non-volatile memory; and
   a cache configured to store a table structured as a record of an operation history performed by the data storage device, the operation history including an ordered list of LBAs and respective PBAs corresponding to the LBAs, the ordered list ordered in a manner to indicate the operation history,
   wherein the controller is configured to, read data stored at a first PBA of the non-volatile memory corresponding to a first LBA by referring to the mapping table in response to receiving a command to read data corresponding to the first LBA received from outside of the data storage device, the command including the first LBA, perform an ECC operation on the read data using the ECC information, directly compare the first LBA received from outside the storage device with a second LBA included in the read data from the non-volatile memory, the directly comparing in response to reading the data successfully, and retry reading the data corresponding to the first LBA from the non-volatile memory in response to the first LBA being different from the second LBA.

2. The data storage device of claim 1, wherein in response to the second LBA being different from the first LBA, the controller is configured to update the mapping table stored in the buffer and then retry reading the data from the non-volatile memory.

3. The data storage device of claim 2, wherein the controller is configured to update the mapping table by transferring the operation history recorded in the cache to the buffer.

4. The data storage device of claim 1, wherein the controller is configured to,
access the cache in response to receiving a command to read data corresponding to the first LBA,
read data from the non-volatile memory that is stored at the first PBA by referring to the cache in response to the cache comprising the first LBA, and
read the data from the non-volatile memory that is stored at the first PBA by referring to the mapping table in response to the cache not comprising the first LBA.

5. The data storage device of claim 1, wherein the controller is configured to
retry reading the data corresponding to the first LBA a specific number of times, and
transmit the read data in response to the specific number of times being exceeded.

6. The data storage device of claim 1, wherein in response to the read data being uncorrectable data, the controller is configured to transmit the uncorrectable data.

7. The data storage device of claim 1, wherein in response to the read data not existing, the controller is configured to retry reading the data a specific number of times.

8. A data storage device comprising:
a buffer;
a non-volatile memory configured to store a mapping table comprising physical block addresses (PBAs) corresponding to logical block addresses (LBAs), wherein the non-volatile memory includes a plurality of pages, each of the plurality of pages including a user data region configured to store user data and a spare region configured to store ECC information and an LBA;
a cache configured to store a table structured as a record of an operation history performed by the data storage device, the operation history including an ordered list of LBAs and respective PBAs corresponding to the LBAs, the ordered list ordered in a manner to indicate the operation history; and
a controller configured to control the buffer and the non-volatile memory,
wherein the controller is configured to,
store, in the buffer, the mapping table in response to power being supplied externally, read data stored at a first PBA of the non-volatile memory corresponding to a first LBA by referring to the mapping table stored in the buffer in response to receiving a command to read the data received from outside of the data storage device, the command including the first LBA, perform an ECC operation of the read data using the ECC information, in response to reading the data successfully, directly compare the first LBA received from outside the storage device with a second LBA included in the read data from the non-volatile memory retry reading the data corresponding to the first LBA from the non-volatile memory in response to the first LBA being different from the second LBA, and store, in the non-volatile memory, the mapping table in response to the power not being supplied.

9. The data storage device of claim 8, wherein in response to the second LBA being different from the first LBA, the controller is configured to update the mapping table stored in the buffer and then retry reading the data from the non-volatile memory.

10. The data storage device of claim 9, wherein the controller is configured to update the mapping table by transferring the operation history recorded in the cache to the buffer.

11. The data storage device of claim 8, wherein the controller is configured to,
access the cache in response to receiving the command to read the data,
read data from the non-volatile memory that is stored at the first PBA by referring to the cache in response to the cache comprising the first LBA, and
read the data from the non-volatile memory that is stored at the first PBA by referring to the mapping table in response to the cache not comprising the first LBA.

12. The data storage device of claim 8, wherein the controller is configured to
retry reading the data a specific number of times, and
transmit the read data in response to the specific number of read retries being exceeded.

13. The data storage device of claim 8, wherein in response to the read data being uncorrectable data, the controller is configured to transmit the uncorrectable data.

14. The data storage device of claim 8, wherein in response to the read data not existing, the controller is configured to retry reading the data a specific number of times.

15. A data storage device comprising:
a buffer configured to store a mapping table comprising physical block addresses (PBAs) corresponding to logical block addresses (LBAs);
a non-volatile memory configured to include a plurality of pages, each of the plurality of pages including a user data region and a spare region, the spare region configured to store error-correcting code (ECC) information and LBA data;
a cache configured to store a table structured as a record of an operation history performed by the data storage device, the operation history including an ordered list of LBAs and respective PBAs corresponding to the LBAs, the ordered list ordered in a manner to indicate the operation history; and
a controller configured to control the buffer and the non-volatile memory,
wherein the controller is configured to, receive first data comprising a first LBA and first user data from outside of the data storage device, store the first LBA received from outside the data storage device and the first user data received from outside the data storage device at a PBA of the non-volatile memory corresponding to the first LBA, the PBA determined by referring to the mapping table, perform an ECC operation of the first user data using the ECC information, and repeat a read operation until second data comprising a second LBA is read from the non-volatile memory, the second LBA directly matching the first LBA that is received from outside the data storage device in response to the first data being read successfully, the repeat in response to receiving, from outside of the data storage device, a command to read the second data.

16. The data storage device of claim 15, wherein the controller is configured to, access the cache in response to receiving the command to read the second data, read data from the non-volatile memory that is stored at a first PBA in response to the cache comprising the first LBA, and read the data from the non-volatile memory that is stored at the first PBA by referring to the mapping table in response to the cache not comprising the first LBA.

17. The data storage device of claim 15, wherein, in response to receiving a command to read the second data, the controller is configured to, update the mapping table stored in the buffer and read the second data in the repeating of the read operation until the second data comprising the second LBA is read from the non-volatile memory.

18. The data storage device of claim 17, wherein the controller is configured to update the mapping table by transferring the operation history recorded in the cache to the buffer.

19. The data storage device of claim 15, wherein the controller repeats the read operation a specific number of times.

20. The data storage device of claim 15, wherein the controller repeats the read operation a specific number of times in response to the read data not existing.

* * * * *